(12) United States Patent
Mathew et al.

(10) Patent No.: US 9,843,441 B2
(45) Date of Patent: Dec. 12, 2017

(54) COMPACT, LOW POWER ADVANCED ENCRYPTION STANDARD CIRCUIT

(71) Applicant: Intel Corporation, Santa Clara, CA (US)

(72) Inventors: Sanu Mathew, Hillsboro, OR (US); Vikram Suresh, Amherst, MA (US); Sudhir Satpathy, Hillsboro, OR (US); Mark Anders, Hillsboro, OR (US); Himanshu Kaul, Portland, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 14/035,508

(22) Filed: Sep. 24, 2013

(65) Prior Publication Data

US 2015/0086007 A1    Mar. 26, 2015

(51) Int. Cl.
*H04L 9/28* (2006.01)
*H04L 9/06* (2006.01)

(52) U.S. Cl.
CPC ........ *H04L 9/0631* (2013.01); *H04L 2209/24* (2013.01)

(58) Field of Classification Search
CPC ... H04L 9/0631; H04L 9/0681; H04L 9/0693; H04L 9/0675
See application file for complete search history.

(56) References Cited

U.S. PATENT DOCUMENTS

| | | | | |
|---|---|---|---|---|
| 7,809,132 B2* | 10/2010 | Nadehara | ............... | H04L 9/0631 380/28 |
| 8,509,424 B2* | 8/2013 | Deng | .................... | H04L 9/0631 380/28 |
| 8,625,781 B2* | 1/2014 | Lubberhuizen | ....... | H04L 9/0631 380/28 |
| 2003/0039355 A1* | 2/2003 | McCanny | ........... | G06F 17/5045 380/37 |
| 2004/0047466 A1* | 3/2004 | Feldman | ............... | H04L 9/0631 380/37 |
| 2010/0208885 A1* | 8/2010 | Murphy | .................. | H04L 9/003 380/28 |

* cited by examiner

*Primary Examiner* — Matthew Smithers
*Assistant Examiner* — Paul Callahan
(74) *Attorney, Agent, or Firm* — Nicholson De Vos Webster & Elliott LLP

(57) ABSTRACT

Embodiments of an invention for a compact, low power Advanced Encryption Standard circuit are disclosed. In one embodiment, an apparatus includes an encryption unit having a substitution box and an accumulator. The substitution box is to perform a substitution operation on one byte per clock cycle. The accumulator is to accumulate four bytes and perform a mix-column operation in four clock cycles. The encryption unit is implemented using optimum Galois Field polynomial arithmetic for minimum area.

14 Claims, 17 Drawing Sheets

(Encryption Timing Diagram)

Key Generation Block

Decryption Datapath micro-Architecture (Decryption Timing Diagram)

COMPACT, LOW POWER ADVANCED ENCRYPTION STANDARD CIRCUIT

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to protect confidential information by encrypting it, for example, using an algorithm according to the Advanced Encryption Standard (AES) specification adopted by the National Institute of Science and Technology as Federal Information Processing Standard 197.

AES algorithms use a private key to transform unencrypted information (plain-text) into encrypted information (cipher-text) that generally has no meaning unless subsequently decrypted by a reverse transformation using the private key. AES algorithms include an iterative sequence of operations, where each iteration is referred to as a round. A round is performed on the plain-text to produce a first intermediate result, and then repeated exactly or substantially on the first intermediate result to produce a second intermediate result, and so on, until the information is satisfactorily encrypted. The private key is expanded or otherwise transformed to derive a series of round keys so that a different key is used during each round.

Each AES round is performed on 128 bits of data arranged in a two dimensional array, called the state. Each encryption round, except the last round, includes combining the round key with the state (add-key operations), processing the state using a non-linear substitution table (S-box operations), shifting the rows of the state (shift-row operations), and mixing the columns of the state (mix-column operations). The mix-column operation is omitted from the last round. The number of rounds depends on the length of the key. AES may use a 128, 192, or 256 bit key; the number of rounds is 10, 12, or 14, respectively.

BRIEF DESCRIPTION OF THE FIGURES

The present invention is illustrated by way of example and not limitation in the accompanying figures.

DETAILED DESCRIPTION

Embodiments of an invention for a compact, low power AES circuit are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

As described in the background section, confidential or other information represented as data in an information processing system may be encrypted using an algorithm according to the Advanced Encryption Standard (AES) specification. An information processing system may include dedicated hardware to perform part or all of one or more AES algorithms. Embodiments of the present invention may be desired to perform all or part of one or more AES algorithms using a dedicated hardware accelerator circuit having a compact area and low power consumption.

Figure 1:
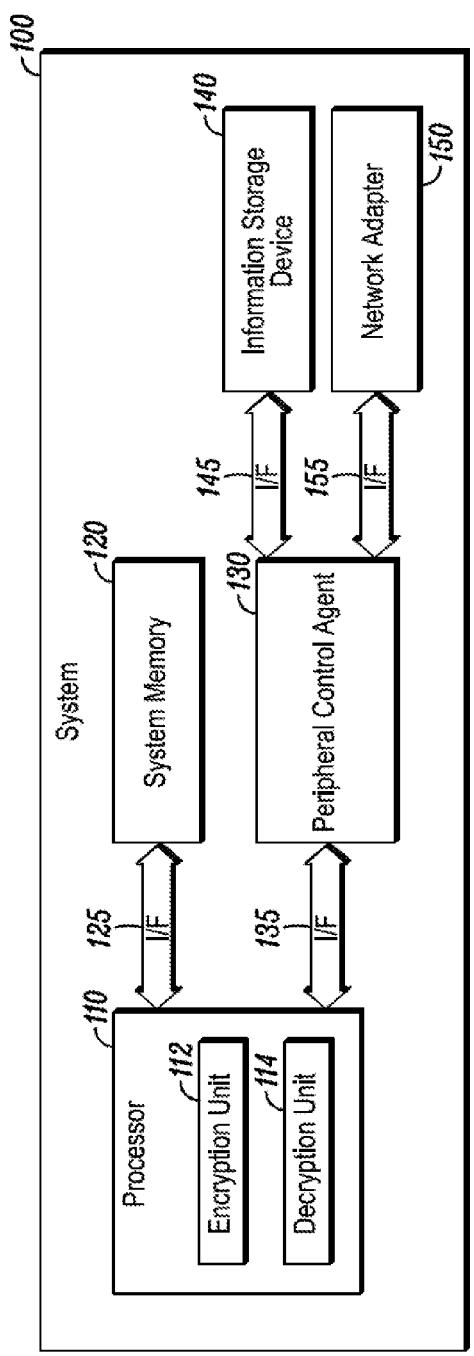
FIG. 1 illustrates a system in which information may be encrypted and decrypted according to an embodiment of the present invention.

FIG. 1 illustrates system 100, an information processing system in which information may be encrypted and decrypted according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, system memory 120, peripheral control agent 130, information storage device 140, and network adapter 150. Systems embodying the present invention may include any number of each of these components and any other peripherals, input/output devices, or other components.

Processor 110 may represent one or more processors integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller.

System memory 120 may represent dynamic random access memory or any other type of medium readable by processor 110. Peripheral control agent 130 may represent any component including or through which peripheral, input/output, or other components or devices may be connected or coupled to processor 110, such as a chipset. Information storage device 140 may represent any type of persistent or non-volatile memory or storage, such as a flash memory and/or a solid state, magnetic, or optical disk drive. Network adapter 150 may represent any adapter or other device through which system 100 may be connected to and/or transfer data through a wired or wireless network.

Although FIG. 1 shows processor 110 connected to system memory 120 through interface 125 and to peripheral control agent 130 through interface 135, and peripheral control agent 130 connected to information storage device 140 through interface 145 and to network adapter 150 through interface 155, any or all of the components or other elements in this or any system embodiment may be connected, coupled, or otherwise in communication with each other through any number of buses, point-to-point, or other wired or wireless interfaces or connections, unless specified otherwise. Furthermore, any components or other portions of system 100, whether shown in FIG. 1 or not shown in FIG. 1, may be integrated or otherwise included on or in a single chip (a system-on-a-chip or SOC), die, substrate, or package.

Returning to processor 110, encryption unit 112 may represent circuitry or other hardware to encrypt data according to an embodiment of the present invention, and decryption unit 114 may represent circuitry or other hardware to decrypt data according to an embodiment of the present invention. Encryption unit 112 and decryption unit 114 may each include dedicated circuitry, registers, and other hardware and/or circuitry, registers, and other hardware shared between encryption unit 112 and decryption unit 114 and/or any other unit in processor 110.

Embodiments of the present invention may provide for encrypting information to be stored in system memory 120 and/or information storage device 140, stored and/or used by peripheral control agent 130, transmitted by peripheral control agent 130 and/or network adapter 150 and/or through any of interfaces 125, 135, 145, and 155, and/or for any other use, storage, or transmission.

Figure 2:
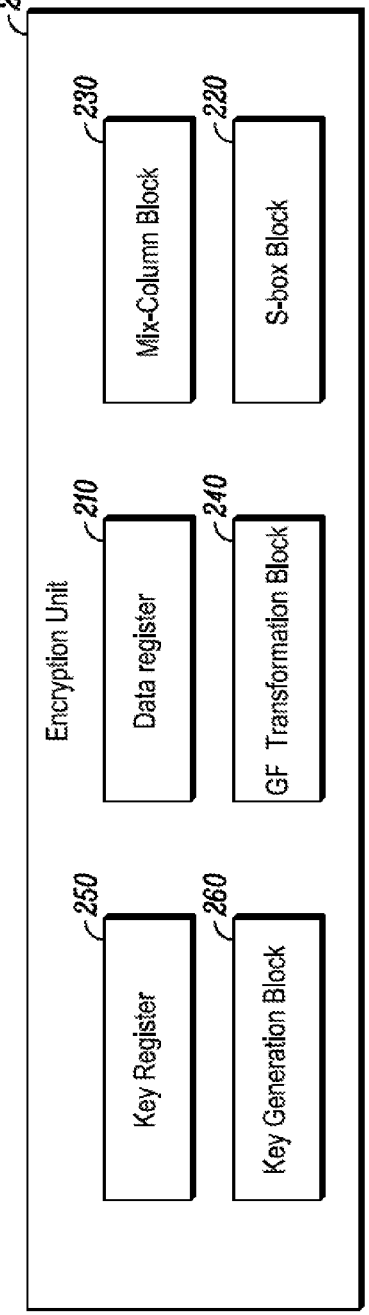
FIG. 2 illustrates an encryption unit according to an embodiment of the present invention.

FIG. 2 illustrates encryption unit 200, which may represent an embodiment of encryption unit 112 in FIG. 1. Encryption unit 200 includes data register 210, S-box block 220, mix-column block 230, Galois-Field (GF) transformation block 240, key register 250, and key generation block 260. Encryption unit 200 includes an 8-bit datapath which provides for encryption unit 200 to operate on one byte per clock cycle. Therefore, the area of encryption unit 200 may be smaller than that of an AES encryption unit that operates on 128 bits per clock cycle (e.g., S-box block 220 may include a single 8-bit S-box instead of sixteen 8-bit S-boxes). To provide for encryption unit 200 to operate on one byte per clock cycle, encryption unit 200 (e.g., data register 210 and mix-column box 230) may provide for out-of-order sequencing of bytes and out-of-order processing of operations that cross byte boundaries (e.g. shift-row and mix-column).

Data register 210 include circuitry and/or hardware to store and move data, including plain-text, intermediate results, and cipher-text. Data register 210 may perform the byte permutation (shift-row) operations of the AES algorithm as described below.

S-box block 220 includes circuitry and/or hardware to perform the S-box operations, including the multiplicative inverse and affine functions of the AES algorithm, as described below.

Mix-column block 230 includes circuitry and/or hardware to perform the linear interpolation (mix-column) operations of the AES algorithm. Mix-column block 230 may perform the column mixing serially and accumulate intermediate results, as described below.

GF transformation block 240 includes circuitry and/or hardware to map data (i.e., the state and the round keys) between the Galois field of $GF(2^8)$ and a composite field of $GF(2^4)^2$. The area of encryption unit 200 may be reduced using GF arithmetic in the form of ground-field and extension-field polynomials found by exploring the GF polynomial space.

Key register 250 includes circuitry and/or hardware to store and move key data, including the private keys and the round keys.

Key generation block 260 includes circuitry and/or hardware to generate the round keys. Generation of the round keys using key generation block 260 may be performed on-the-fly such that key generation for each round alternates with encryption operations for each round (ping-ponged round key generation), as described below.

Figure 3:
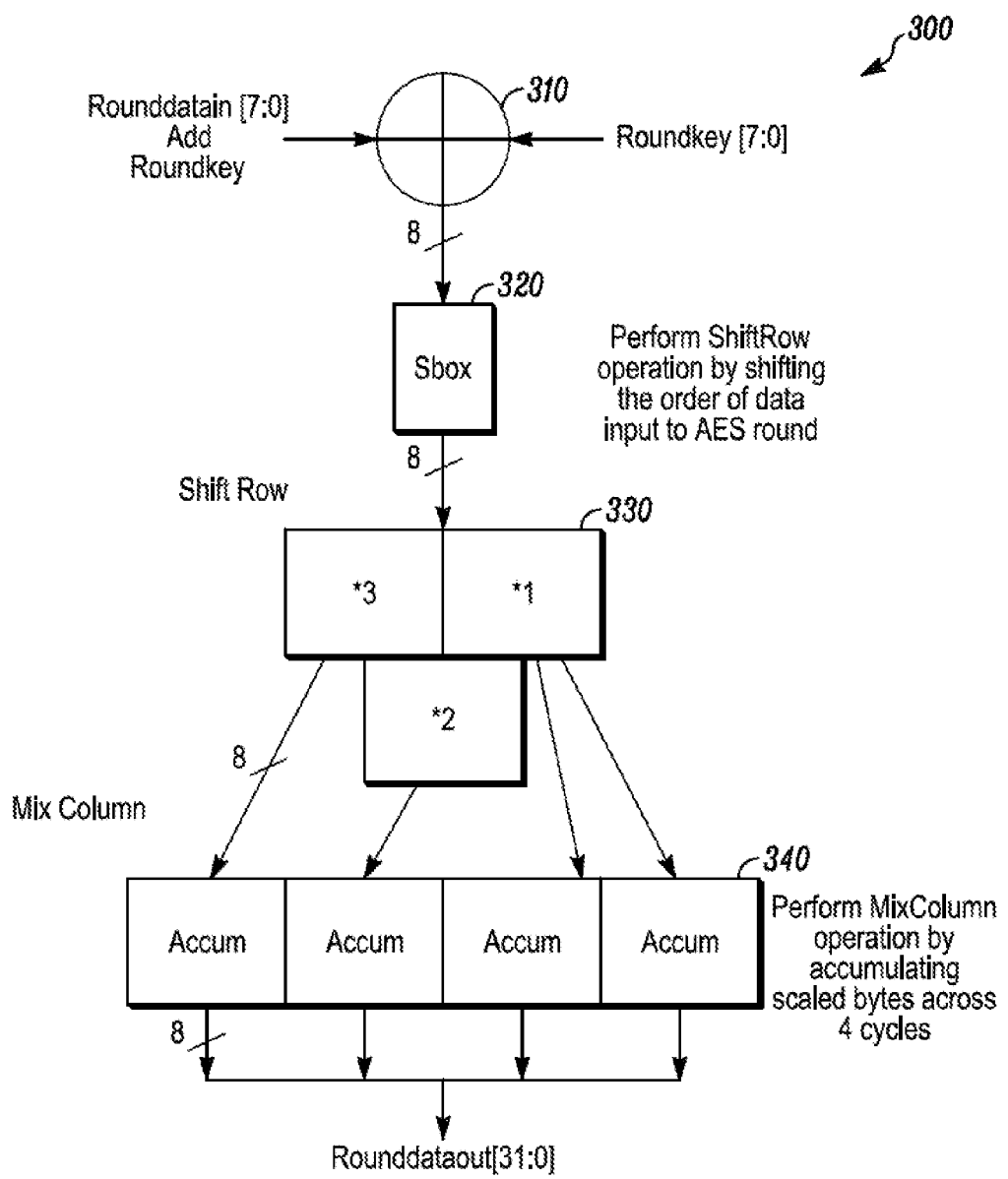
FIG. 3 illustrates an encryption datapath according to an embodiment of the present invention.
Figure 4:
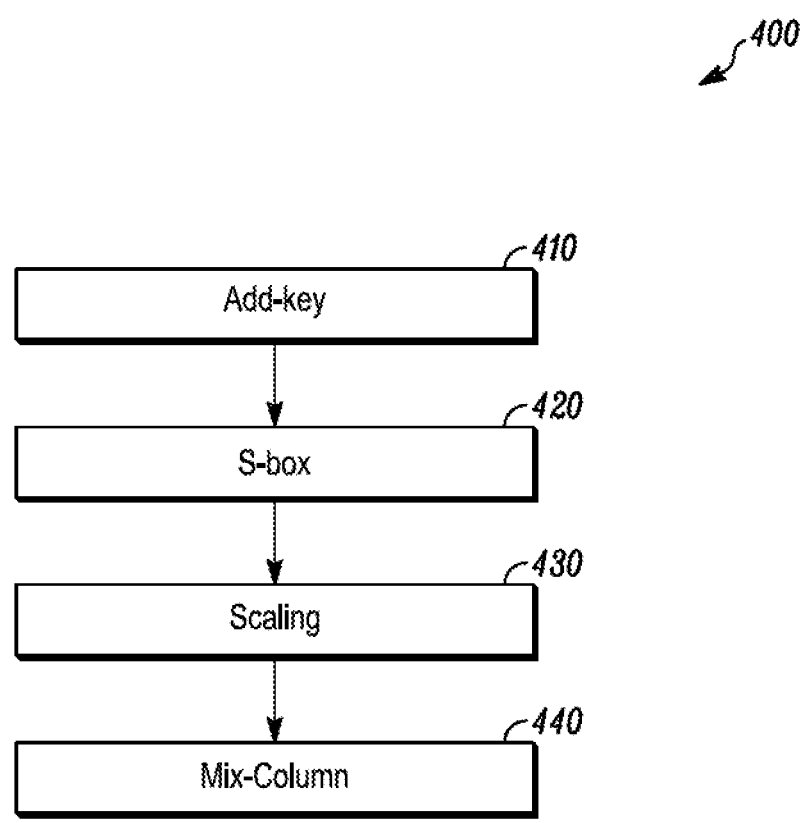
FIG. 4 illustrates a method of operation of an encryption datapath according to an embodiment of the present invention.

FIG. 3 illustrates encryption datapath micro-architecture 300, an embodiment of a portion of the micro-architecture of encryption unit 200, and FIG. 4 illustrates method 400, an embodiment of the method of operation of encryption datapath micro-architecture 300. In box 410, a byte of data (e.g., plain-text or an intermediate result) is combined (e.g., using bitwise exclusive-OR (XOR) gate 310) with a corresponding byte of a round key (i.e., the add-key operation). In box 420, a non-linear substitution is performed (e.g., using S-box 320) on the byte (i.e., the S-box operation). In box 430, the byte is scaled, in parallel (e.g., using scaling block 330), to generate four scaled bytes for the mix-column operation, as further described below. In box 440, the four scaled bytes are stored in or combined with the contents of accumulator 340 to perform the mix-column operation, as further described below. Accumulator 340 accumulates data across four clock cycles to generate a 32-bit output.

Note that FIGS. 3 and 4 do not show the shift-row operation of the AES algorithm. The shift-row operation is performed by the operation of data register 210, such that the sequence of data bytes to the input of encryption micro-architecture 300 provides for the bytes to be mixed together in the mix-column operation to be processed in adjacent clock cycles.

Figure 5:
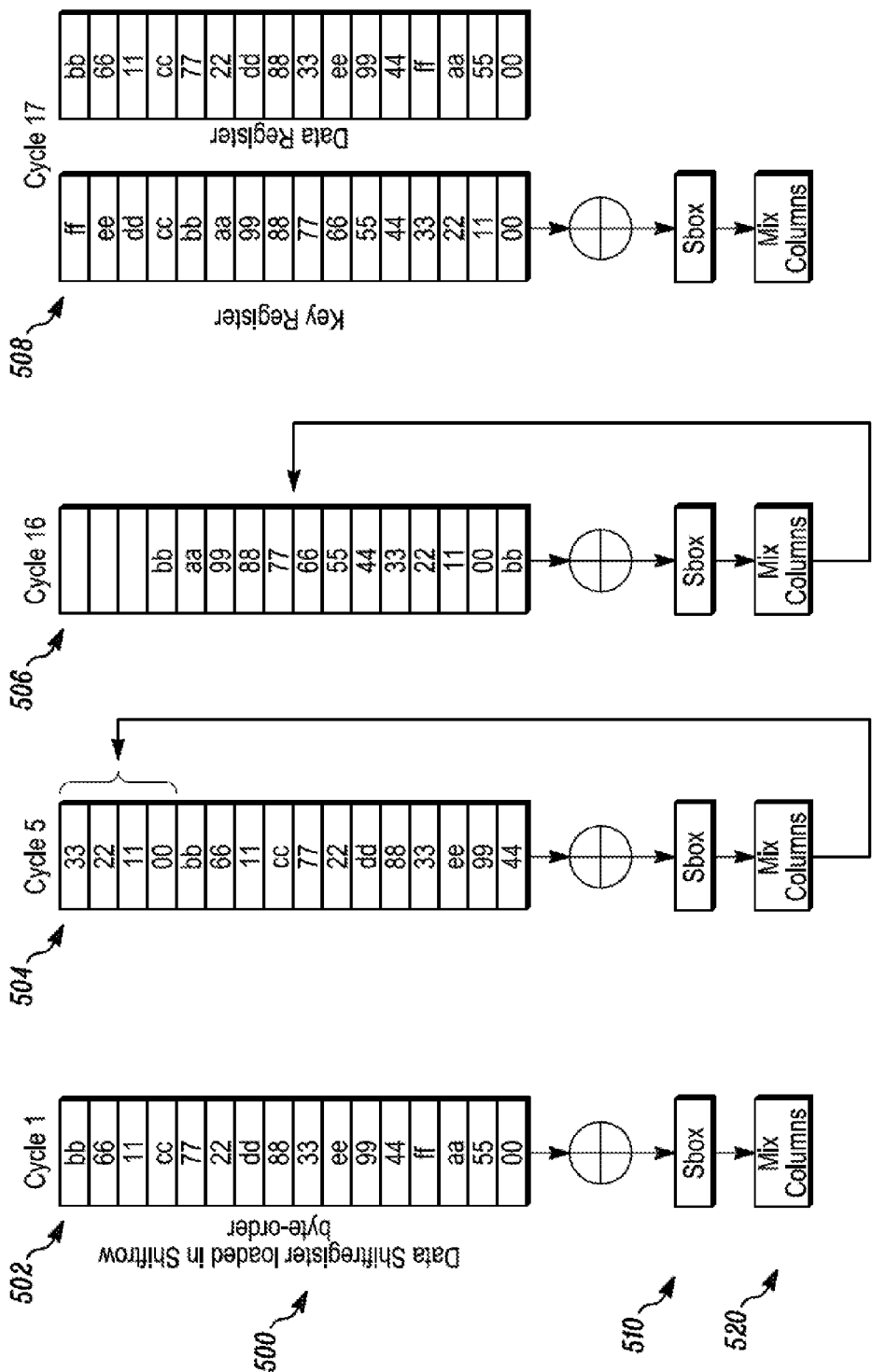
FIG. 5 illustrates data flow through a data register according to an embodiment of the present invention.

FIG. 5 illustrates data flow through data register 500 of FIG. 5, which may represent an embodiment of data register 210 of FIG. 2. Data register 500 includes sixteen locations, each to store a byte of a 128-bit data string (e.g., plain-text or intermediate result) to be processed in a round. The sixteen consecutive bytes of the 128-bit data string may be referred to as bytes 0h (corresponding to bits 127:120) through Fh (corresponding to bits 7:0), and conceptually arranged in a four-by-four matrix with bytes 0h through 3h (top to bottom) in the first column, bytes 4h through 7h (top to bottom) in the second column, bytes 8h through Bh (top to bottom) in the third column, and bytes Ch through Fh (top to bottom) in the fourth column. According to the sequence of a round of the AES algorithm, after the add-key and S-box operations are performed on each byte, the shift-row operation re-orders the bytes such that the mix-column operations use bytes 0h, 5h, Ah, and Fh to calculate bytes 0h through 3h for the next round; bytes 4h, 9h, Eh, and 3h to calculate bytes 4h through 7h for the next round; bytes 8h, Dh, 2h, and 7h to calculate bytes 8h through Bh for the next round; and bytes Ch, 1h, 6h, and Bh to calculate bytes Ch through Fh for the next round.

Therefore, at the beginning of clock cycle 1 (reference number 502), the sixteen bytes of the 128-bit data string have been (as described below) arranged in data register 500 in the following order (from first to be processed to last to be processed): 0h, 5h, Ah, Fh, 4h, 9h, Eh, 3h, 8h, Dh, 2h, 7h, Ch, 1h, 6h, Bh.

At each clock tick, data advances down by one location. Therefore, at the beginning of clock cycle 5 (reference number 504), bytes 0h, 5h, Ah, and 4h have been processed by key XOR gate 510, s-box 520, and mix-column accumulator 530, which generates a 32-bit output which is fed back into the top of data register 500 as bytes 0h, 1h, 2h, and 3h of the input data string for the next round.

At the beginning of clock cycle 16 (reference number 506), the last input byte (Bh) is at the bottom of shift register 500, remaining to be processed, and output bytes 0h through Bh have been fed back into the top of shift register 500 in preparation for the next round. The shift-row byte re-ordering is performed (as described below) by the operation of data register 500 during the next clock cycle, during which time key generation (as described below) for the next round begins.

Figure 6:
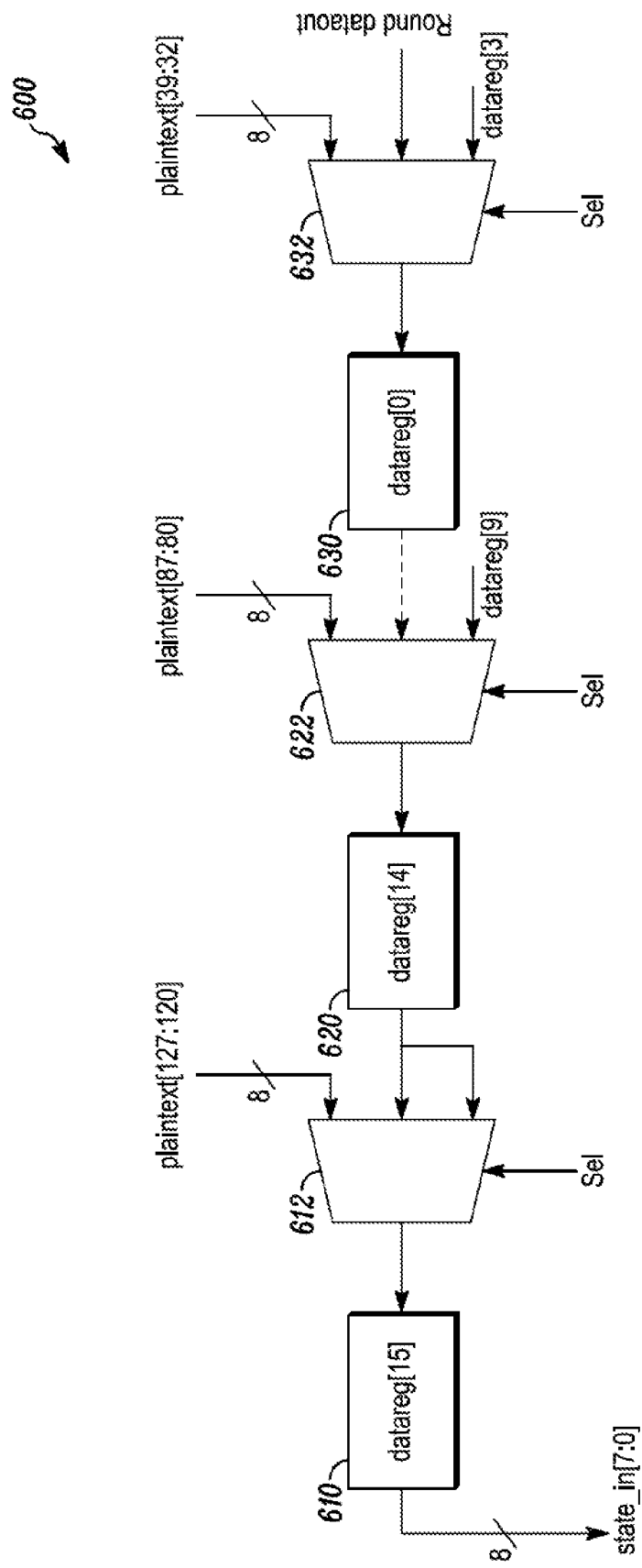
FIG. 6 illustrates a data register according to an embodiment of the present invention.

FIG. 6 illustrates data register 600, which may represent an embodiment of data register 210 of FIG. 2. Data register 600 includes a bank of sixteen 8-bit registers arranged in series, three of which (dataregs 610, 620, and 630) are shown. In this description, the end of data register 600 that includes datareg 610 may be referred to as the output end of data register 600, and the end of data register 600 that includes datareg 630 may be referred to as the input end of data register 600. The input to each of the sixteen 8-bit registers is fed by one of sixteen 3:1 multiplexers, three of which (muxes 612, 622, and 632) are shown and which operate as follows. Generally, the select input of each 3:1 multiplexer selects either a byte of the 128-bit plain-text data string (the top input), a byte from the preceding 8-bit data register to shift the data bytes sequentially from the input end towards the output end and encryption micro-architecture 300 (the middle input), or a byte from an appropriate 8-bit data register to perform the shift-row operation (the bottom input). Local interconnects route the outputs of the 8-bit data registers to the appropriate 3:1 multiplexers.

Figure 7:
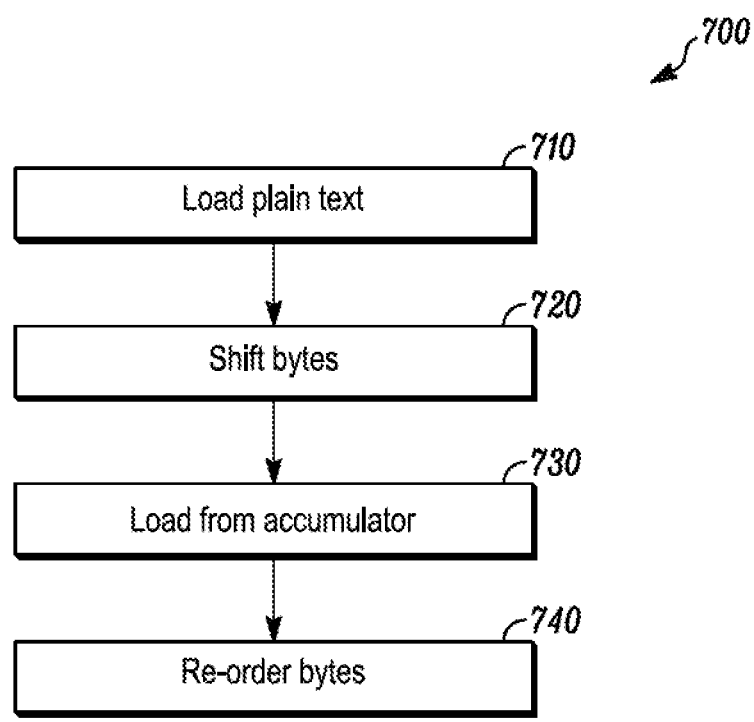
FIG. 7 illustrates a method of operation of a data register according to an embodiment of the present invention.

More specifically, the operation of data register 600 may be described according method embodiment 700 of the present invention as shown in FIG. 7.

In box 710 of method 700, to start the encryption of a 128-bit plain-text data string, the sixteen bytes of the 128-bit data string are loaded into data register 600 according to the arrangement described above (0h, 5h, Ah, Fh, 4h, 9h, Eh, 3h, 8h, Dh, 2h, 7h, Ch, 1h, 6h, Bh) by each of the sixteen 3:1 multiplexers selecting the appropriate byte of the plain-text data string from the top input and loading it into the corresponding 8-bit register. For example, bits 127:120 (byte 0h) of the plain-text data string are selected by mux 612 and loaded into datareg 610, bits 87:80 (byte 5h) are selected by mux 622 and loaded into datareg 620, and bits 39:32 (byte Bh) are selected by mux 632 and loaded into datareg 630.

Thus, the sixteen bytes of the 128-bit plain-text data string are arranged for processing in the proper shift-row order for the add-key, S-box, and mix-column operations as described above. In box 720, during the sixteen clock cycles (one for each byte) of these operations, the data bytes are shifted from the input end of data register 600 to the output end of data register 600, once per clock cycle, such that byte 0h is processed first and byte Bh is processed last. For example, the output of datareg 610 is fed into the input of XOR gate 310 as shown in FIG. 3, while the output of datareg 620 is selected by mux 612 from the middle input and loaded into datareg 610, and so on.

Meanwhile, in box 730, after the first four clock cycles, the second four clock cycles, the third four clock cycles, and the fourth four clock cycles (each, a four-clock cycle), the 32-bit output of accumulator 340 is fed into the four 8-bit registers at the input end of data register 600. For example, after the first four clock cycles, byte 0h for the next round is loaded into the input register fourth from the input end, byte 1h for the next round is loaded into the input register third from the input end, byte 2h for the next round is loaded into the input register second from the input end, and byte 3h for the next round is loaded into the input register at the input end (datareg 630).

In box 740, after the sixteenth clock cycle and each of the bytes has been processed through encryption micro-architecture 300, instead of selecting the middle input to shift the data bytes sequentially (which would refill data register 600 in order from byte 0h at the input end to byte Fh at the input end), the 3:1 multiplexers load the 8-bit data registers from the bottom input to accomplish the shift-row re-ordering for the next round. Specifically, the data bytes are shuffled by the 3:1 multiplexers, each of which loads a byte from one of the 8-bit registers to the same or a different 8-bit register to move them into the following order (from output end to input end): 0h, 5h, Ah, Fh, 4h, 9h, Eh, 3h, 8h, Dh, 2h, 7h, Ch, 1h, 6h, Bh. For example, the output of datareg 620 (holding byte 0h) is selected by mux 612 and loaded into datareg 610, the output of the datareg (not shown) holding byte 5h is selected by mux 622 and loaded into datareg 620, and the output of the datareg (not shown) holding byte Bh is selected by mux 632 and loaded into datareg 630.

After the clock cycle in which the shift-row re-ordering is performed by data register 600, key generation (as described below) for the next round may begin. Key generation for the next round may be performed (as described below) in sixteen clock cycles, after which the next round of encryption may begin. Sixteen clock cycles of encryption may alternate with sixteen clock cycles of key generation, as shown in encryption timing diagram 800 in FIG. 8, such that the ten rounds of encryption using a 128-bit key may be completed in 336 clock cycles. Note that in the final round of encryption, the shift-row operation to re-order the data bytes in data register 600 for the next round is not needed.

Figure 9:
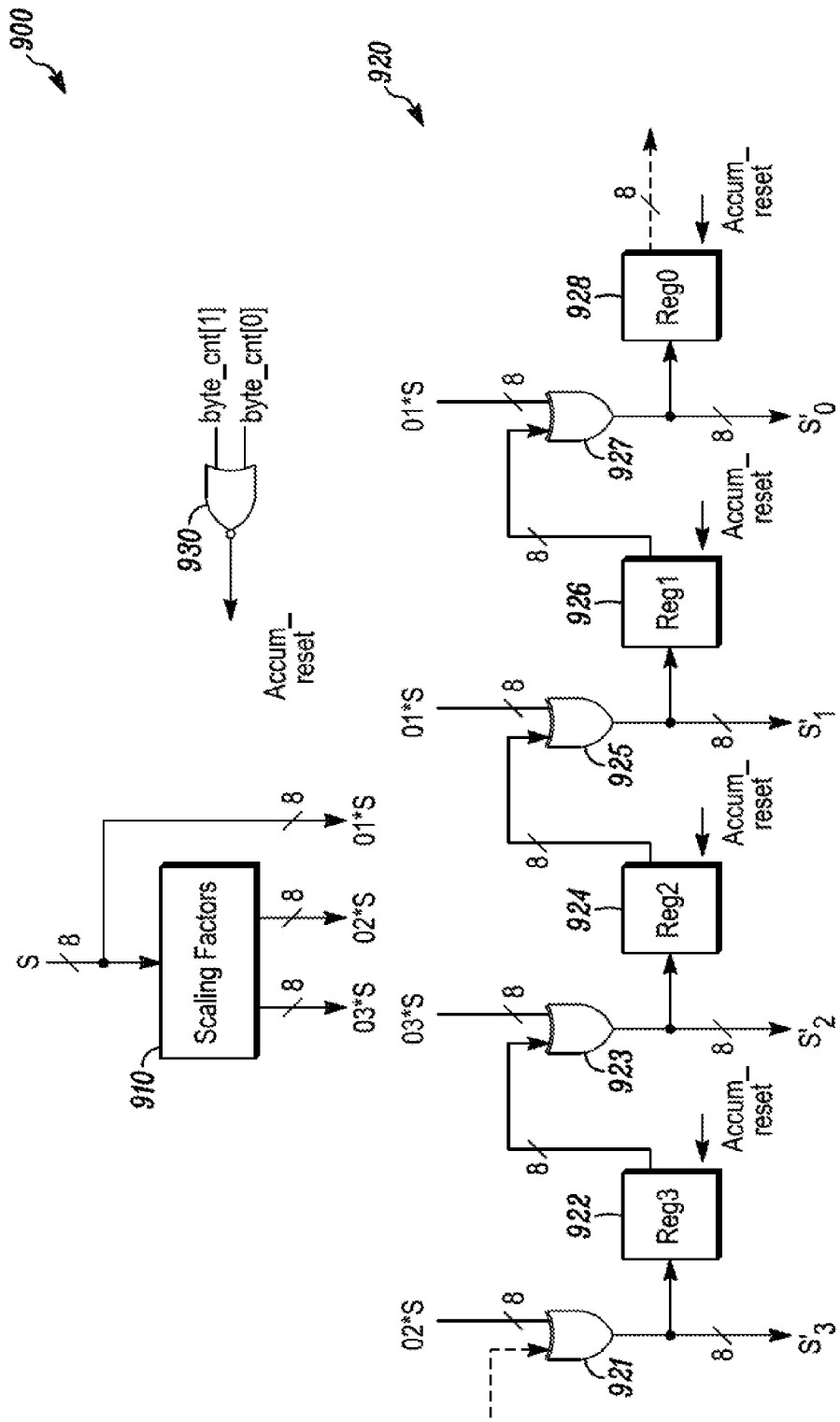
FIG. 9 illustrates a mix-column block according to an embodiment of the present invention.

Returning to the mix-column operation, FIG. 9 illustrates mix-column block 900, which may represent an embodiment of mix-column block 230 of FIG. 2. Mix-column block 900 includes scaling block 910, accumulator 920, and reset gate 930, to perform the mix-column operation according to a serial-accumulating approach as follows. Generally, mix-column block 900 receives one byte of the state per clock cycle, scales the byte to generate three scaled bytes, and serially accumulates, over four clock cycles, the results of calculations using three scaled bytes for four different input bytes of the state to generate a 32-bit result.

Figure 10:
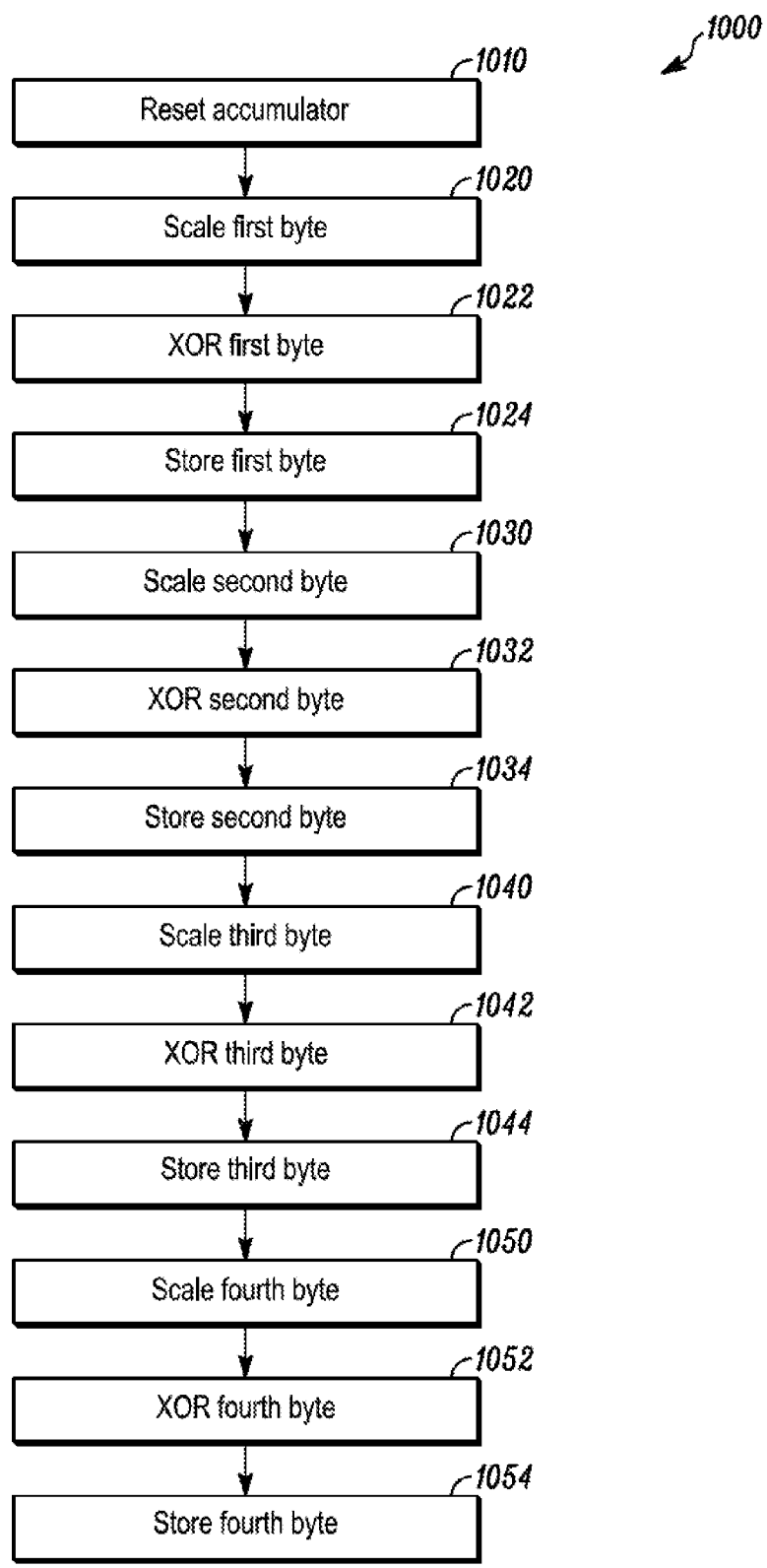
FIG. 10 illustrates a method of operation of a mix-column block according to an embodiment of the present invention.

More specifically, the operation of mix-column block 900 may be described according method embodiment 1000 of the present invention as shown in FIG. 10. In box 1010 of method 1000, at the start of each four-clock cycle (i.e., at the end of each four-clock cycle), accumulator 920 is reset (i.e., cleared) by reset gate 930.

In box 1020, during a first clock cycle, scaling block 910 scales a first input byte of the state by multiplying it within the GF by a factor of 3, by a factor of 2, and by a factor of 1 to generate the three scaled bytes for the first input byte. In box 1022, each of these scaled bytes is fed into one or more XOR gates in accumulator 920. In box 1024, the output of each XOR gate is fed into a register in accumulator 920 to serve as the first term for one of the four output bytes to be calculated.

For example, according to the AES algorithm, byte 0h for the next round will be calculated using four bytes from the current round as follows: 2*(byte 0h)+3*(byte 5h)+1*(byte Ah)+1(byte Fh); where the multiplication operations are accomplished by the scalings described above and the addition operations will be accomplished by XORing within the GF the four scaled bytes. Therefore, during the first clock cycle, the scaling of byte 0h by the factor of 2 is fed into XOR gate 921 (where it is unchanged because it is XORed with the zero value stored in register 928) and then into register 922.

In box 1030, during a second clock cycle, scaling block 910 scales a second input byte of the state by multiplying it within the GF by a factor of 3, by a factor of 2, and by a factor of 1 (i.e., unscaled) to generate the three scaled bytes for the second input byte. In box 1032, each of these scaled bytes is fed into one or more XOR gates in accumulator 920. In box 1034, the output of each XOR gate is fed into a register in accumulator 920 to serve as a running sum of the first and second terms for one of the four output bytes to be calculated.

Returning to the above example, in which byte 0h for the next round will be calculated as 2*(byte 0h)+3*(byte 5h)+1*(byte Ah)+1(byte Fh), during the second clock cycle the scaling of byte 5h by the factor of 3 is fed into XOR gate 923, where it is XORed with the value 2*(byte 0h) calculated and stored in register 922 during the first clock cycle, and the result is fed into register 922.

In box 1040, during a third clock cycle, scaling block 910 scales a third input byte of the state by multiplying it within the GF by a factor of 3, by a factor of 2, and by a factor of 1 to generate the three scaled bytes for the third input byte. In box 1042, each of these scaled bytes is fed into one or more XOR gates in accumulator 920. In box 1044, the output of each XOR gate is fed into a register in accumulator 920 to serve as a running sum of the first, second, and third terms for one of the four output bytes to be calculated.

Returning to the above example, in which byte 0h for the next round will be calculated as 2*(byte 0h)+3*(byte 5h)+1*(byte Ah)+1(byte Fh), during the third clock cycle the scaling of byte Ah by the factor of 1 (i.e., unscaled) is fed into XOR gate 925, where it is XORed with the value [2*(byte 0h)+3*(byte 5h)] calculated and stored in register 924 during the second clock cycle, and the result is fed into register 926.

In box 1050, during a fourth clock cycle, scaling block 910 scales a fourth input byte of the state by multiplying it within the GF by a factor of 3, by a factor of 2, and by a factor of 1 to generate the three scaled bytes for the fourth input byte. In box 1052, each of these scaled bytes is fed into one or more XOR gates in accumulator 920. In box 1054, the output of each XOR gate (a running sum of the first, second, third, and fourth terms) is used as one of the four output bytes.

Returning to the above example, in which byte 0h for the next round is calculated as 2*(byte 0h)+3*(byte 5h)+1*(byte Ah)+1(byte Fh), during the fourth clock cycle the scaling of byte Fh by the factor of 1 (i.e., unscaled) is fed into XOR gate 927, where it is XORed with the value [2*(byte 0h)+3*(byte 5h)+1*(byte Ah)] calculated and stored in register 926 during the third clock cycle, and the result is fed back into data register 210.

Figure 11:
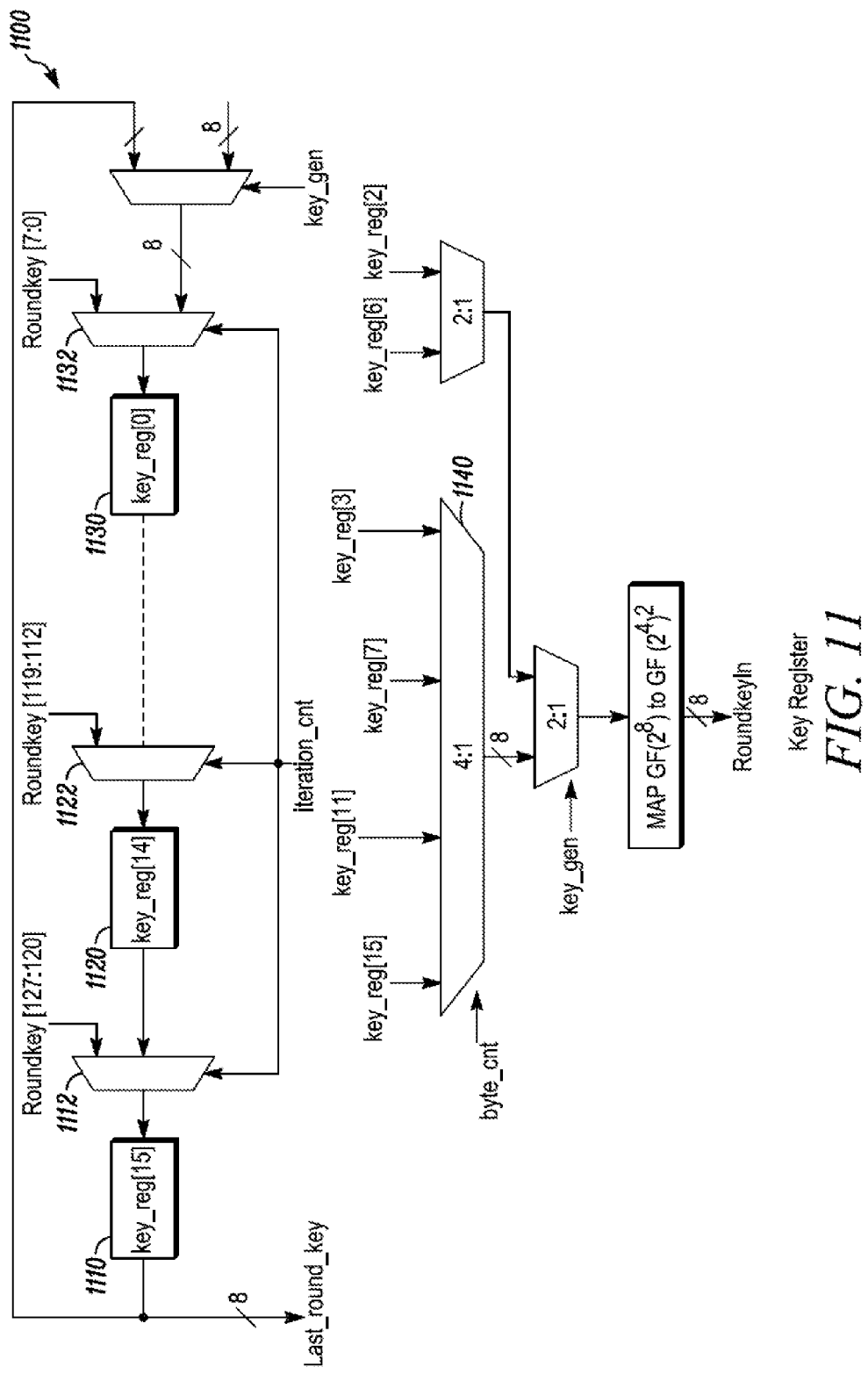
FIG. 11 illustrates a key register according to an embodiment of the present invention.

FIG. 11 illustrates key register 1100, which may represent an embodiment of key register 250 in FIG. 2. Key register 1100 includes a bank of sixteen 8-bit registers arranged in series, three of which (keyregs 1110, 1120, and 1130) are shown. In this description, the end of key register 1100 that includes keyreg 1110 may be referred to as the output end of key register 1100, and the end of key register 1100 that includes keyreg 1130 may be referred to as the input end of key register 1100. The input to each of the sixteen 8-bit registers is fed by one of sixteen 2:1 multiplexers, three of which (muxes 1112, 1122, and 1132) are shown and which operate as follows.

Generally, the select input of each of the sixteen 2:1 multiplexers selects either a byte of the 128-bit round key (the top input) or a byte from the preceding 8-bit key register to shift the key bytes sequentially from the input end towards the output end (the bottom input). Round keys, both initial and expanded, are stored in order (e.g., byte 0h at output end to byte Fh at input end) in key register 1100 and rotated one position to the left each clock cycle. Since the data bytes are re-ordered as described above, multiplexer 1140 may select any of the byte from the fourth, eighth, twelfth, and sixteenth 8-bit key register (numbered from the input end to the output end, i.e., the sixteenth is keyreg 1110) to obtain the byte of the round key that corresponds to the byte of data.

At the start of each round or encryption, the round key is loaded into key register 1100 as described above. During each round of encryption, the key bytes are shifted one position to the left and fed back into the input end, such that after sixteen clock cycles of encryption, the sixteen bytes of the round key are returned to their original order for key expansion. During key expansion, the key bytes are also shifted one position to the left, such that each byte of the key for the next round is fed back into the input end. After sixteen clock cycles of key expansion, the sixteen key bytes for the preceding round have been replaced by sixteen key bytes for the next round, which are stored in order to start the next round of encryption. In this way, the operation of key register 1100 provides for ping-ponged on-the-fly round key generation.

Figure 8:
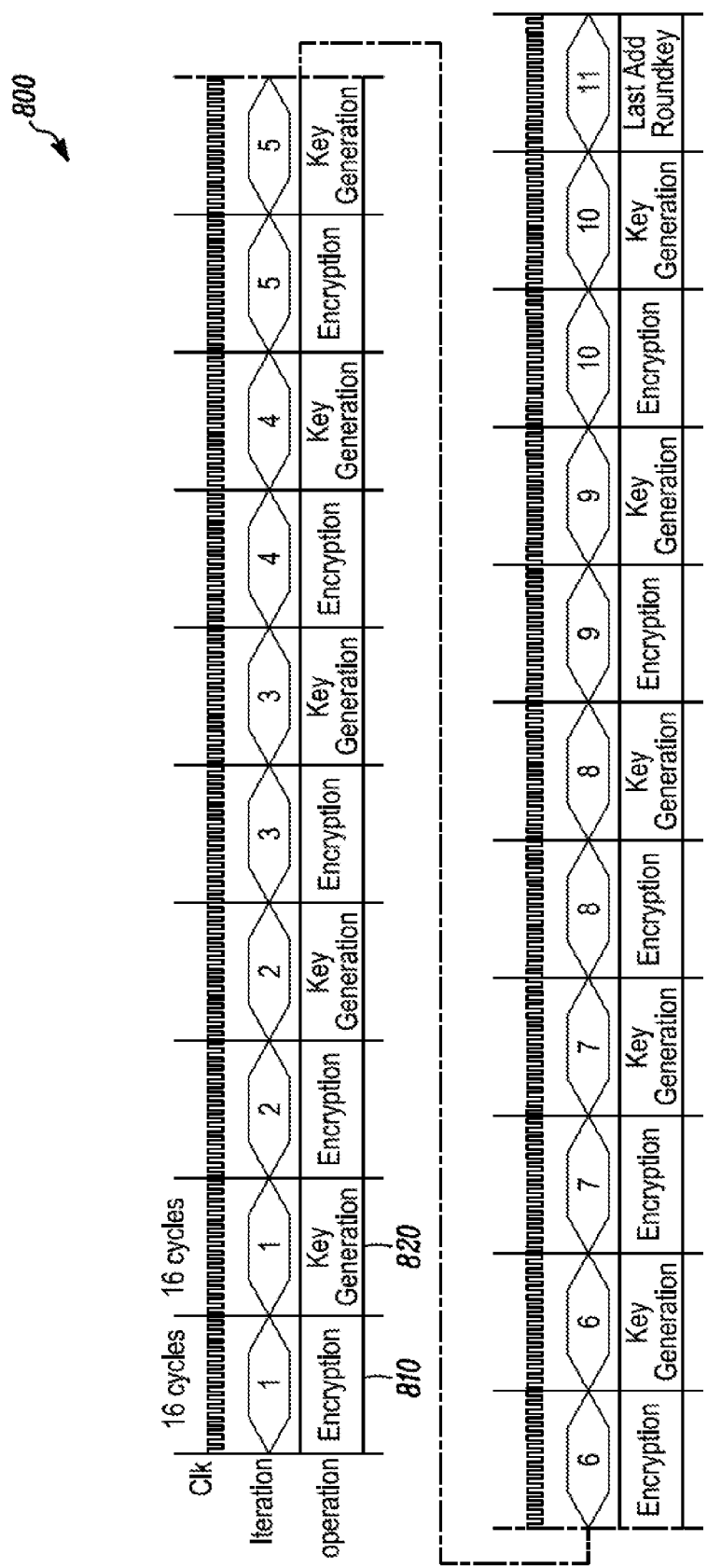
FIG. 8 illustrates an encryption timing diagram according to an embodiment of the present invention.

Therefore, the output of key register 1100 is used for encryption during some clock cycles (e.g., clock cycles 810 in FIG. 8) and for key generation during other clock cycles (e.g., clock cycles 820 in FIG. 8). Accordingly, a portion of the datapath from key register 1100 may be shared between encryption and key generation.

Figure 12:
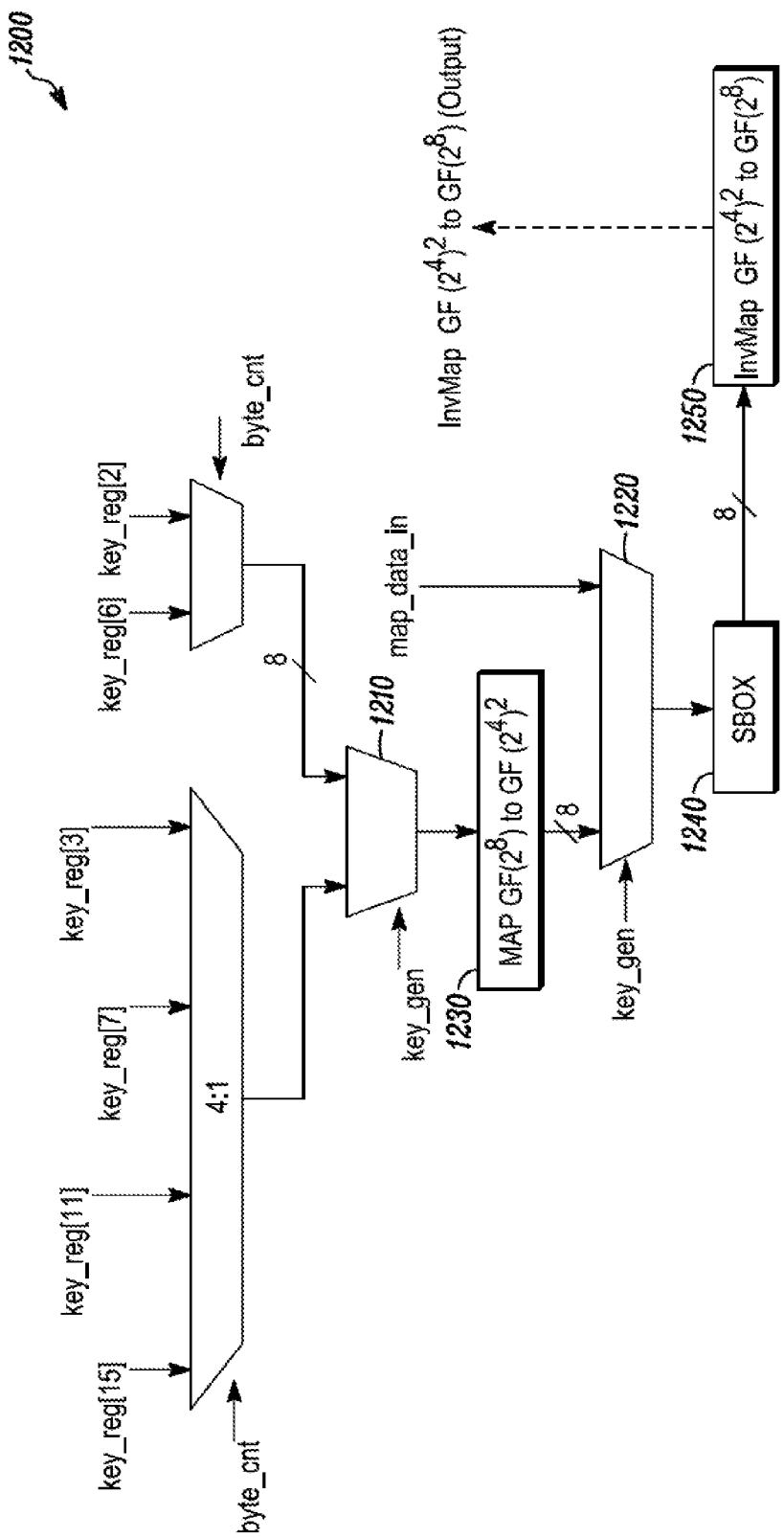
FIG. 12 illustrates a key byte datapath according to an embodiment of the present invention.

Specifically, FIG. 12 illustrates key byte datapath 1200. For encryption, multiplexers 1210 and 1220 select the key bytes to be used for encryption. For key generation, multiplexers 1210 and 1220 select the key bytes to be used for key generation. Therefore, GF mapper 1230 and S-box 1240 may be shared between encryption and key generation.

As will be further described below, encryption is performed in $GF(2^4)^2$, so GF mapper 1230 maps key bytes from $GF(2^8)$ to $GF(2^4)^2$. However, since key generation is performed in $GF(2^8)$, after key bytes are mapped from $GF(2^8)$ to $GF(2^4)^2$ by GF mapper 1230, then processed by S-box 1240, they are mapped back to $GF(2^8)$ by GF inverse mapper 1250 before key generation is performed.

Figure 13:
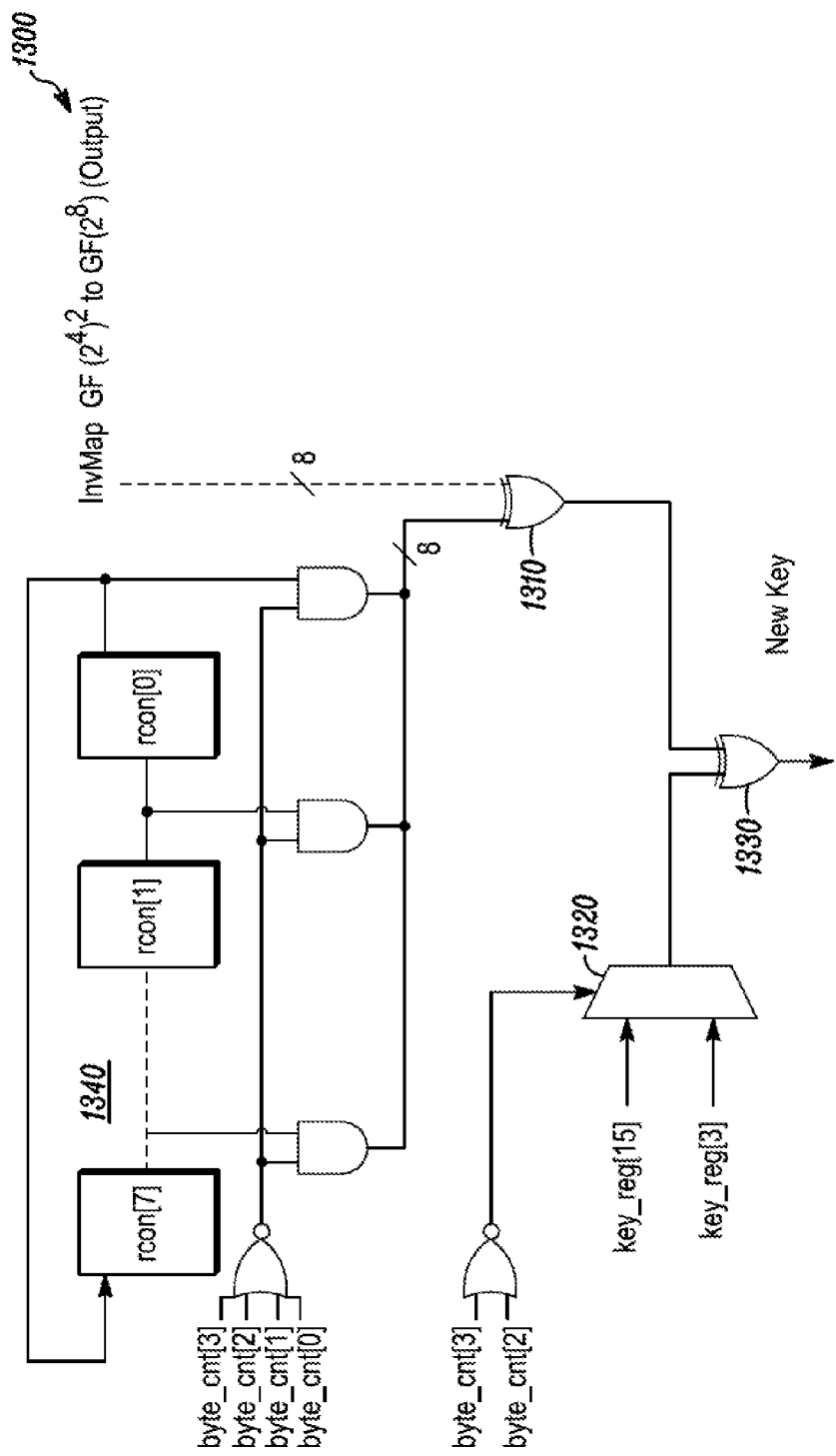
FIG. 13 illustrates a key generation block according to an embodiment of the present invention.

FIG. 13 illustrates key generation block 1300, which may represent an embodiment of key generation block 260 in FIG. 2. Key generation block 1300 receives, as an input to XOR gate 1310, a key byte from inverse mapper 1250 (see FIG. 12) and, as inputs to multiplexer 1320, two key bytes from key register 1100 (see FIG. 11). Key generation block 1300 generates, as an output from XOR gate 1330, a new key byte calculated according to the AES key expansion schedule, which is fed back to the input end of key register 1100 (see FIG. 11). The new key byte is calculated using constants rotated through RCON register 1340, based on the round number and number of new key bytes already generated in the current round.

Figure 14:
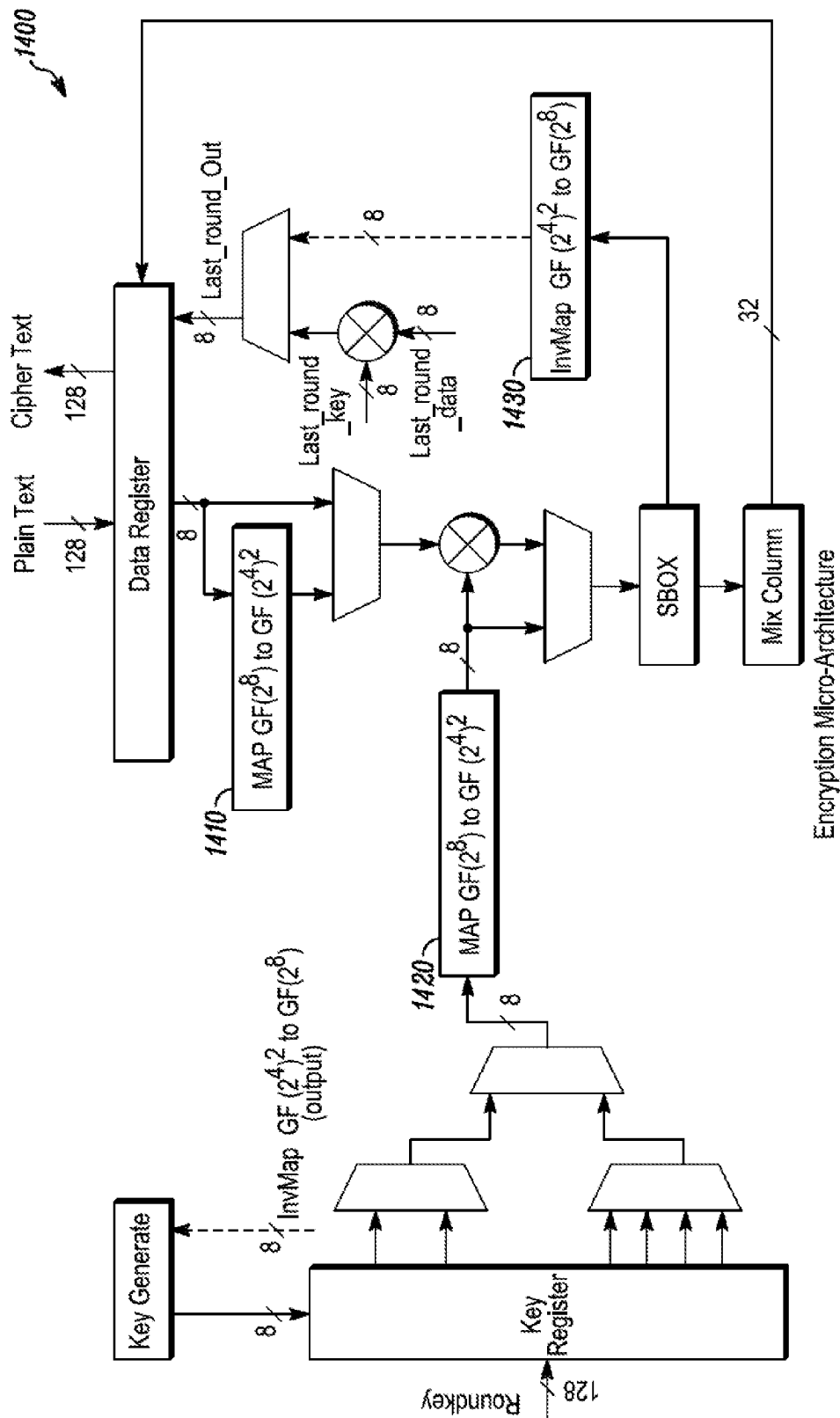
FIG. 14 illustrates an encryption unit micro-architecture according to an embodiment of the present invention.

FIG. 14 illustrates encryption micro-architecture 1400, an embodiment of the micro-architecture of encryption unit 200. As mentioned above, encryption is performed in $GF(2^4)^2$, so GF mapper 1410 maps data bytes from $GF(2^8)$ to $GF(2^4)^2$ and GF mapper 1420 maps key bytes from $GF(2^8)$ to $GF(2^4)^2$, then inverse GF mapper 1430 maps the output bytes back to $GF(2^8)$. Although many conventional designs use $x^2+x+B$ as the extension-field polynomial and $x^4+x+1$ as the ground-field polynomial, the encryption micro-architecture 1400 may be implemented in less area using different polynomials, which may be chosen as described below. In one embodiment, encryption micro-architecture 1400 may be implemented using $x^2+6x+C$ as the extension-field polynomial, $x^4+x^3+1$ as the ground-field polynomial, and 61h as the mix-column scaling factor.

Figure 15:
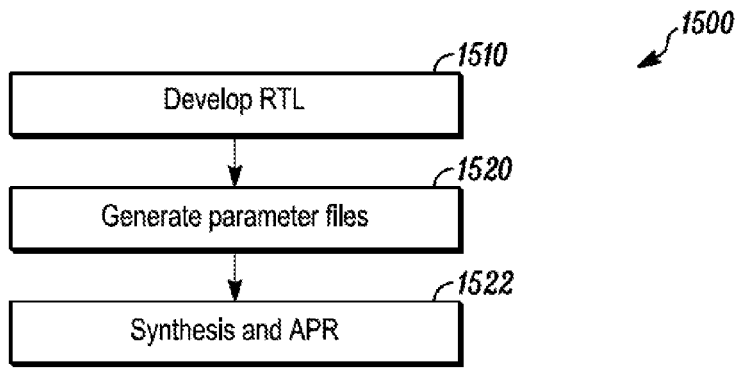
FIG. 15 illustrates a method for determining the Galois field polynomial arithmetic for an encryption micro-architecture according to an embodiment of the present invention.
Figure 16:
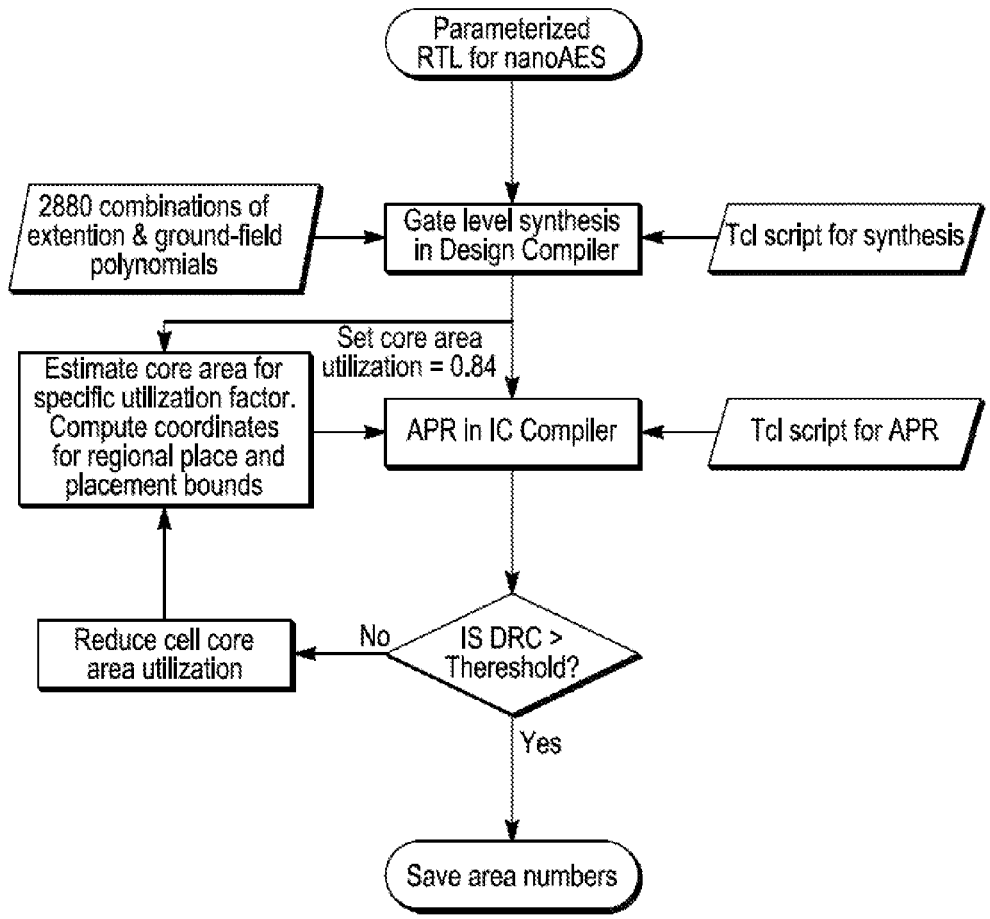
FIG. 16 illustrates an algorithm to explore the polynomial space and find the optimal Galois field arithmetic according to an embodiment of the present invention.

FIG. 15 illustrates method 1500 for determining the GF polynomial arithmetic for encryption micro-architecture 1400. In box 1510, a parameterized register transfer level (or other hardware description) model of encryption micro-architecture 1400 is developed. In box 1520, a C++ (or other programming language) model is created to generate multiple (e.g., 2880 or one for each polynomial combination) parameter files. In box 1530, each design is run through synthesis and automated placement and routing to determine the lowest area meeting timing constraints, using the algorithm shown in FIG. 16.

Figure 17:
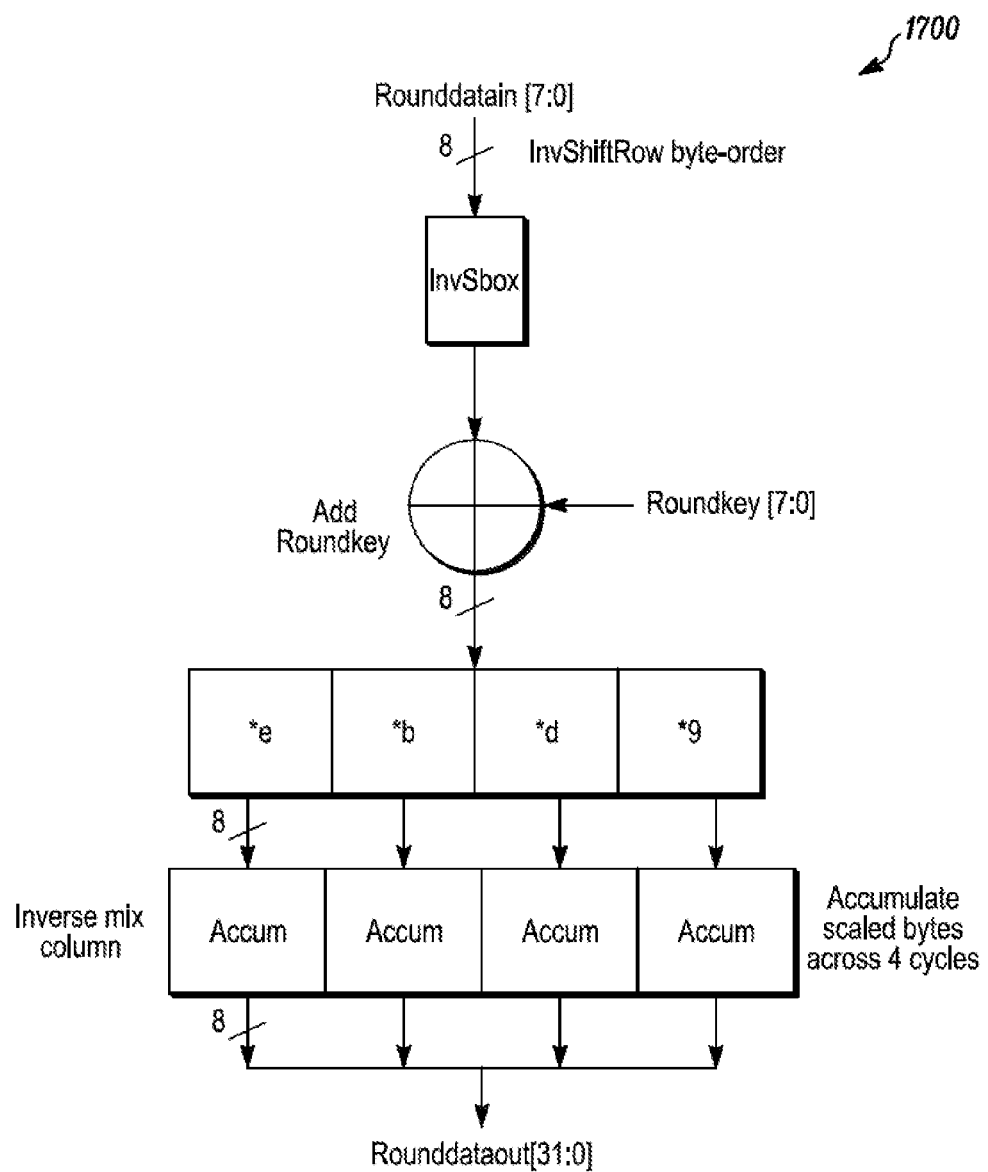
FIG. 17 illustrates a decryption datapath micro-architecture according to an embodiment of the present invention.

FIG. 17 illustrates decryption datapath micro-architecture 1700, an embodiment of a portion of the micro-architecture of decryption unit 114 of FIG. 1. Decryption datapath micro-architecture 1700 provides for decryption unit 114 to operate on one byte per clock cycle, as described above for encryption. However, since the add-round-key stage of the decryption cycle is after the inverse-shift-row operation, the data ordering constraint is imposed on the key register only during the first add-round-key operation.

Figure 18:
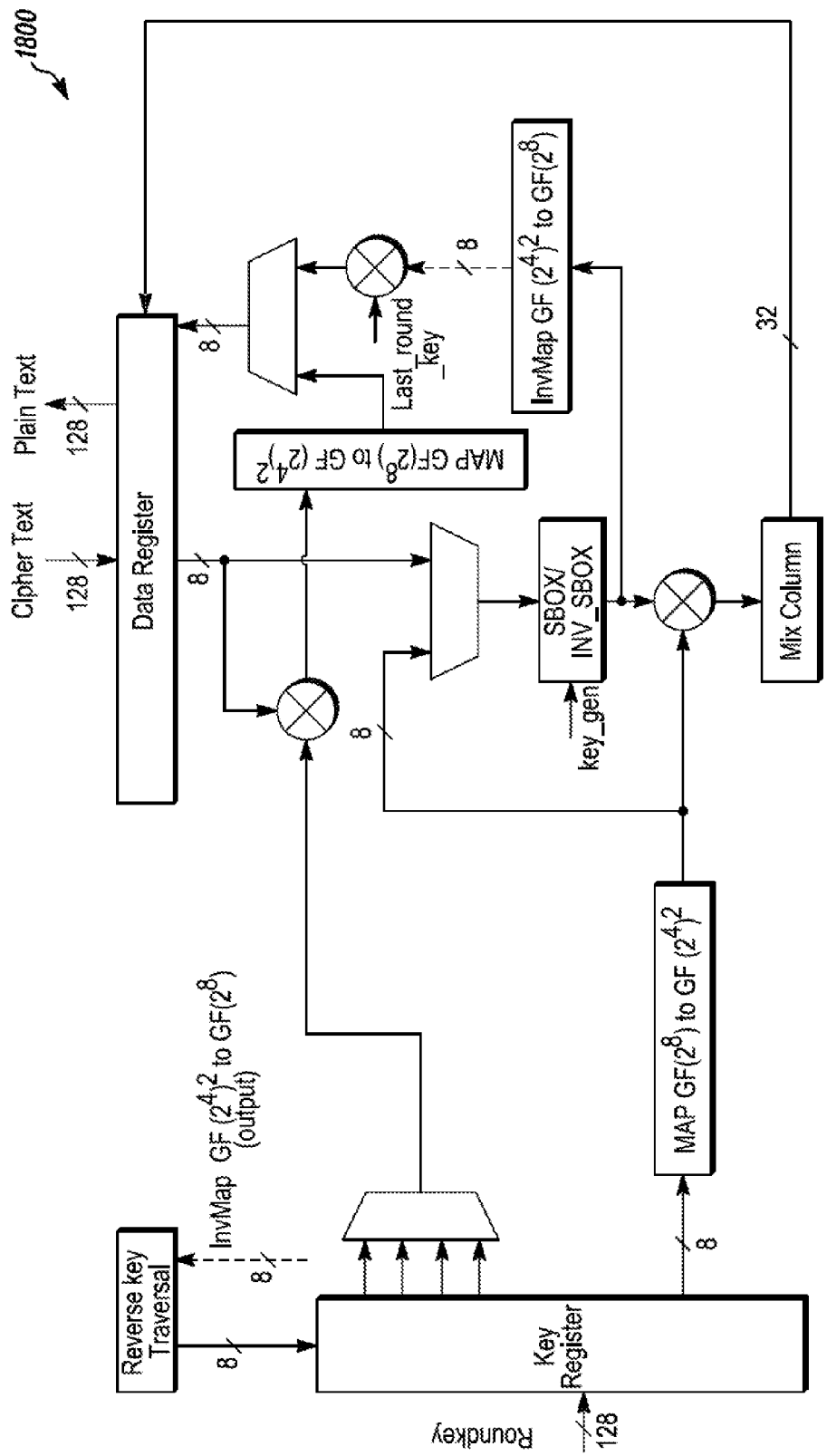
FIG. 18 illustrates a decryption micro-architecture according to an embodiment of the present invention.
Figure 19:
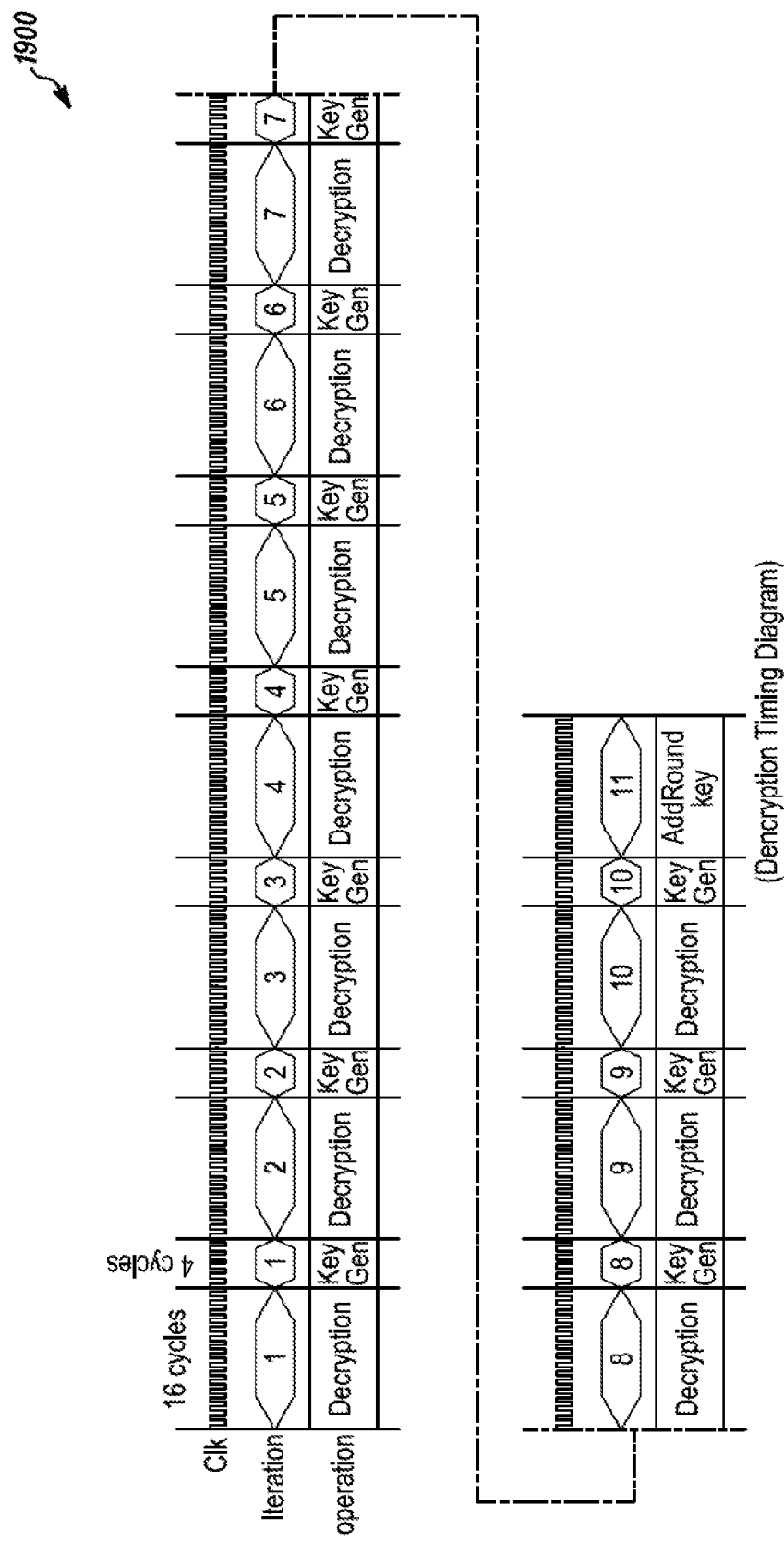
FIG. 19 illustrates a decryption timing diagram according to an embodiment of the present invention.

FIG. 18 illustrates decryption micro-architecture 1800, an embodiment of the micro-architecture of decryption unit 114 in FIG. 1. The reverse key transversal operation during AES decryption uses an S-box operation for only four bytes. The remaining twelve bytes are derived with an XOR operation of previous round keys. Therefore, the reverse key generation may be performed in four clock cycles per round, as shown in decryption timing diagram 1900 in FIG. 19, such that decryption using a 128-bit key with on-the-fly reverse key transversal may be completed in 216 clock cycles.

As for the encryption operation described above, the implementation of the decryption operation may be arithmetically optimized. In one embodiment, decryption micro-architecture 1800 may be implemented using $x^2+x+D$ as the extension-field polynomial and $x^4+x+1$ as the ground-field polynomial. Note that different GF arithmetic may be used for encryption and decryption.

In various embodiments of the present invention, the methods illustrated in the figures may be performed in a different order, with illustrated boxes combined or omitted, with additional boxes added, or with a combination of reordered, combined, omitted, or additional boxes. Furthermore, method embodiments of the present invention are not limited to the illustrated methods or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of a method embodiment may be embodied in software or firmware instructions that are stored on a medium readable by a processor, which when executed by the processor, cause the processor to execute an embodiment of the present invention. Also, aspects of the present invention may be embodied in data stored on a machine-readable medium, where the data represents a design or other information usable to fabricate all or part of the processor.

Thus, embodiments of an invention for a compact, low-power AES circuit have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
an encryption unit to perform encryption by processing sixteen bytes of data per round according to an Advanced Encryption Standard algorithm, the encryption unit including
substitution box circuitry to perform a substitution operation on one byte per clock cycle,
an exclusive-OR gate to combine one data byte and one key byte per clock cycle to provide to the substitution box circuitry,
a data register to re-order data bytes to perform a shift-row operation and provide four re-ordered data bytes to the exclusive-OR gate per four clock cycles, wherein the data register includes sixteen one-byte registers in series, each of the sixteen one-byte registers fed by one of sixteen three-input multiplexers, each multiplexer having a first multiplexer input to provide a first byte of plain-text data, a second multiplexer input to provide a second byte of sequentially shifted data, and a third multiplexer input to provide a third byte of re-ordered data,
accumulator circuitry to accumulate four bytes and perform a mix-column operation in four clock cycles, and
scaling circuitry to generate a plurality of scaled bytes from a one-byte substitution box output per clock cycle to provide to the accumulator circuitry, wherein generating the plurality of scaled bytes includes multiplying the one-byte substitution box output by a factor of three and multiplying the one-byte substitution box output by a factor of two.

2. The apparatus of claim 1, wherein the encryption unit also includes a key register to provide four key bytes, corresponding to the four re-ordered data bytes, to the exclusive-OR gate per four clock cycles.

3. The apparatus of claim 2, wherein the encryption unit also includes key generation circuitry to generate one key byte for a next round per clock cycle.

4. The apparatus of claim 3, wherein the encryption unit is to alternate sixteen consecutive clock cycles of encryption with sixteen consecutive clock cycles of key generation.

5. The apparatus of claim 4, wherein the encryption unit also includes a Galois field mapper to map to an extension field and a ground field.

6. The apparatus of claim 5, wherein the encryption unit is based on an extension field polynomial of $x^2+6x+C$.

7. The apparatus of claim 6, wherein the encryption unit is based on a ground field polynomial of $x^4+x^3+1$.

8. A method comprising:
performing, with substitution box circuitry, a substitution operation of an Advanced Encryption Standard (AES) algorithm on one substitution box input byte per clock cycle,
performing an exclusive-OR operation to combine one data byte and one key byte per clock cycle to provide to the substitution operation,
re-ordering data bytes to perform a shift-row operation and provide four re-ordered data bytes to the exclusive-OR operation per four clock cycles, wherein the re-ordering is performed by a data register having sixteen one-byte registers in series, each of the sixteen one-byte registers fed by one of sixteen three-input multiplexers, each multiplexer having a first multiplexer input to provide a first byte of plain-text data, a second multiplexer input to provide a second byte of sequentially shifted data, and a third multiplexer input to provide a third byte of re-ordered data,
generating, with scaling circuitry a plurality of scaled bytes from a one-byte substitution box output per clock cycle, wherein generating the plurality of scaled bytes includes multiplying the one-byte substitution box output by a factor of three and multiplying the one-byte substitution box output by a factor of two, and
accumulating, using accumulator circuitry receiving the plurality of scaled bytes, four accumulator input bytes in four clock cycles to perform a mix-column operation of the AES algorithm.

9. The method of claim 8, further comprising providing four key bytes, corresponding to the four re-ordered data bytes, to the exclusive-OR operation per four clock cycles.

10. The method of claim 9, further comprising generating one key byte for a next round per clock cycle.

11. The method of claim 10, further comprising alternating sixteen consecutive clock cycles of encryption with sixteen consecutive clock cycles of key generation.

12. The method of claim 11, further comprising Galois field mapping to an extension field based on $x^2+6x+C$ and a ground field based on $x^4+x^3+1$.

13. A system comprising:
a processor including
an encryption unit to generate cipher-text from plain-text according to an Advanced Encryption Standard algorithm, the encryption unit including substitution box circuitry to perform a substitution operation on one byte per clock cycle, an exclusive-OR gate to combine one data byte and one key byte per clock cycle to provide to the substitution box circuitry, a data register to re-order data bytes to perform a shift-row operation and provide four re-ordered data bytes to the exclusive-OR gate per four clock cycles, wherein the data register includes sixteen one-byte registers in series, each of the sixteen one-byte registers fed by one of sixteen three-input multiplexers, each multiplexer having a first multiplexer input to provide a first byte of plain-text data, a second multiplexer input to provide a second byte of sequentially shifted data, and a third multiplexer input to provide a third byte of re-ordered data, accumulator circuitry to accumulate four bytes and perform a mix-column operation in four clock cycles, and scaling circuitry to generate a plurality of scaled bytes from a one-byte substitution box output per clock cycle to provide to the accumulator circuitry, wherein generating the plurality of scaled bytes includes multiplying the one-byte substitution box output by a factor of three and multiplying the one-byte substitution box output by a factor of two; and
a memory to store the cipher-text.

14. A method comprising:
developing a hardware description language model for an encryption unit that performs an Advanced Encryption Standard (AES) algorithm and that includes an eight-bit datapath having a single substitution box to perform a substitution operation on one byte per clock cycle, an exclusive-OR gate to combine one data byte and one key byte per clock cycle to provide to the single substitution box, a data register to re-order data bytes to perform a shift-row operation and provide four reordered data bytes to the exclusive-OR gate per four clock cycles, wherein the data register includes sixteen one-byte registers in series, each of the sixteen one-byte registers fed by one of sixteen three-input multiplexers, each multiplexer having a first multiplexer input to provide a first byte of plain-text data, a second multiplexer input to provide a second byte of sequentially shifted data, and a third multiplexer input to provide a third byte of re-ordered data, and scaling circuitry to generate a plurality of scaled bytes from a one-byte substitution box output per clock cycle to provide to accumulator circuitry, wherein generating the plurality of scaled bytes includes multiplying the one-byte substitution box output by a factor of three and multiplying the one-byte substitution box output by a factor of two;
developing a plurality of parameter files, each parameter file for one of a plurality of a plurality of polynomial pairs for Galois field mapping;
simulating the operation of the encryption unit using the plurality of parameter files to determine the optimum polynomial pair for minimum area of the encryption unit meeting timing and design rule constraints.

* * * * *